Patented Jan. 17, 1928.

1,656,239

UNITED STATES PATENT OFFICE.

WALTER SCHOELLER AND KURT SCHMIDT, OF BERLIN, GERMANY, ASSIGNORS TO CHEMISCHE FABRIK AUF ACTIEN (VORM. E. SCHERING.), OF BERLIN, GERMANY.

COMPOSITION OF MATTER AND PROCESS OF MAKING SAME.

No Drawing. Application filed March 4, 1926, Serial No. 92,365, and in Germany March 10, 1925.

Our invention refers to new compositions of matter being derivatives of oxindol-3-carboxylic acids. It more particularly concerns an acid of this kind which is halogen-substituted in the aromatic nucleus and is characterized by the formula

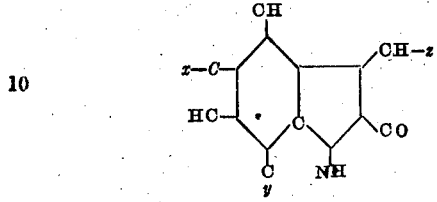

wherein $x$ may be a halogen and $y$ a halogen or hydrogen, or $x$ a halogen or hydrogen and $y$ a halogen, while $z$ is an aliphatic acid radical.

Our invention also includes the method of producing such compounds.

We have found that oxindol-3-acetic acid (Chemisches Zentralblatt 1923 vol. 3 pge. 58) and its homologues can be halogenated in the aromatic nucleus without suffering any decomposition by melting corresponding halogenated oxindol aldehydes with malonic acid and treating the non-saturated carboxylic acids thus obtained with reducing agents.

Example 1.

1 mol oxindol-3-propionic acid, which is obtained by melting together molecular quantities of oxindol aldehyde and malonic acid and reducing the reaction product, is suspended in an excess of concentrated hydrochloric acid and is treated with 1 mol iodine chloride in concentrated hydrochloric acid. The reaction product is allowed to rest some hours at ordinary temperature, whereupon it is poured into a great quantity of water, from which separates out after some time the slightly brownish colored monoiodine oxindol-3-propionic acid.

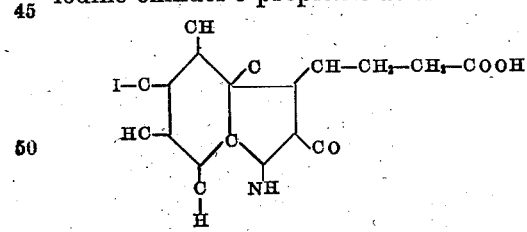

If twice recrystallized from dilute alcohol, there results the pure compound melting at 224°, and forming a yellowish-brown microcrystalline powder which is comparatively readily soluble in alcohol and glacial acetic acid and has properties similar to those of iodine oxindol acetic acid.

Example 2.

1 mol monoiodine oxindol aldehyde, which can be obtained by condensing iodine isatine with oxy thio naphthen carboxylic acid to iodine thio indigo scarlet and decomposing this latter by means of an alcoholic solution of caustic soda to form the aldehyde, is melted in a metal bath at 150-155° C. with 1 mol malonic acid until the liberation of carbon dioxide has come to an end. The cake is dissolved in a dilute solution of caustic soda, the compound is acidulated with dilute hydrochloric acid and the monoiodine oxindol-3-acrylic acid obtained is recrystallized from alcohol and glacial acetic acid. The solution of the sodium salt of this acid is then treated with a reducing agent, preferably with aluminium amalgam and the monoiodine oxindol-3-propionic acid obtained (see Example 1) is treated further in a well known manner.

Example 3.

Diiodine oxindol aldehyde is melted together with malonic acid and treated further as described with reference to Example 2, by treating the diiodine oxindol-3-acrylic acid thus formed with a reducing agent, there is obtained the diiodine oxindol-3-propionic acid

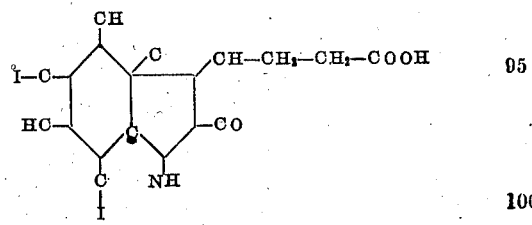

which, on being recrystallized from glacial acetic acid forms a light-brown microcrystalline powder which decomposes at 216° C., readily dissolves in alcohol and glacial acetic acid, less readily in acetone and ether and in almost insoluble in cold and hot water.

We wish it to be understood that we do not desire to be limited to the particular compounds above described nor to the character and sequence of operations, to the quantities, temperatures and other figures mentioned in the foregoing description beyond what is claimed in the appended claims.

We claim:—

1. As a new composition of matter, an oxindol-3-carboxylic acid halogen-substituted in the aromatic nucleus, being characterized by the formula

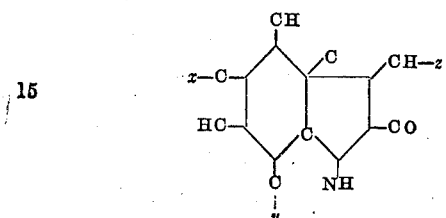

wherein $x$ may be a halogen and $y$ a halogen or hydrogen, or $x$ a halogen or hydrogen and $y$ a halogen, while $z$ is an aliphatic carboxylic acid radical.

2. As a new composition of matter, an oxindol-3-propionic acid halogen-substituted in the aromatic nucleus, being characterized by the formula

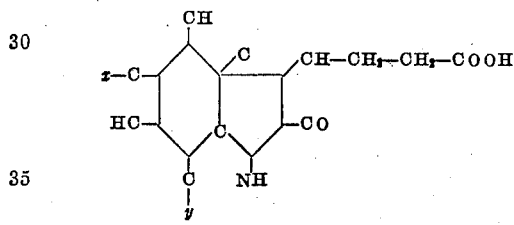

wherein $x$ may be a halogen and $y$ a halogen or hydrogen, or $x$ a halogen or hydrogen and $y$ a halogen.

3. As a new composition of matter, the diiodine-oxindol-3-propionic acid being characterized by the formula

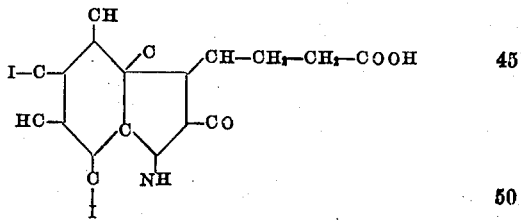

being a light-brown microcrystalline powder which decomposes at 216° C., readily dissolves in alcohol and glacial acetic acid, less readily in acetone and ether and is almost insoluble in cold and hot water.

4. The method of producing an oxindol-3-carboxylic acid halogen-substituted in the aromatic nucleus, comprising melting the corresponding halogen-substituted oxindol aldehyde with the molecular quantity of malonic acid and treating the reaction product with a reducing agent.

5. The method of producing di-iodine-oxindol-3-propionic acid comprising melting diiodine oxindol aldehyde with the molecular quantity of malonic acid to form diiodine oxindol-3-acrylic acid and treating this product with a reducing agent.

In testimony whereof we affix our signatures.

WALTER SCHOELLER.
KURT SCHMIDT.